(12) United States Patent
Pitre et al.

(10) Patent No.: US 8,915,697 B2
(45) Date of Patent: Dec. 23, 2014

(54) MOBILE WIND TURBINE

(75) Inventors: John Pitre, Honolulu, HI (US); Stuart Huang, Honolulu, HI (US)

(73) Assignee: Natural Power Concepts Inc., Honolulu, HI (US)

(*) Notice: Subject to any disclaimer, the term of this patent is extended or adjusted under 35 U.S.C. 154(b) by 481 days.

(21) Appl. No.: 12/461,575

(22) Filed: Aug. 17, 2009

(65) Prior Publication Data

US 2010/0140949 A1    Jun. 10, 2010

Related U.S. Application Data

(60) Provisional application No. 61/213,597, filed on Jun. 23, 2009, provisional application No. 61/202,189, filed on Feb. 4, 2009, provisional application No. 61/189,950, filed on Aug. 22, 2008.

(51) Int. Cl.
  *F03D 1/00*   (2006.01)
  *F03D 1/06*   (2006.01)
  *F03D 7/02*   (2006.01)
  *F03D 11/04*  (2006.01)

(52) U.S. Cl.
  CPC .............. *F03D 11/04* (2013.01); *F03D 1/001* (2013.01); *F05B 2240/2213* (2013.01); *Y02B 10/70* (2013.01); *F03D 1/0658* (2013.01); *F03D 7/0236* (2013.01); *F05B 2240/142* (2013.01); *F05B 2240/641* (2013.01); *Y02B 10/30* (2013.01); *F03D 1/005* (2013.01); *Y02E 10/728* (2013.01); *Y02E 10/725* (2013.01); *Y02E 10/721* (2013.01); *Y02E 10/726* (2013.01); *Y02E 10/723* (2013.01); *F05B 2240/313* (2013.01); *Y10S 415/908* (2013.01)
  USPC .................. 415/1; 415/4.3; 415/4.5; 415/908; 416/142

(58) Field of Classification Search
  USPC ......... 416/DIG. 6, 142, 244 R, 197 A, 132 B; 415/4.3, 4.5, 908, 1; 290/44, 45
  See application file for complete search history.

(56) References Cited

U.S. PATENT DOCUMENTS

| | | |
|---|---|---|
| 155,472 A | 9/1874 | Smythe |
| 271,784 A | 2/1883 | Burnell |

(Continued)

FOREIGN PATENT DOCUMENTS

| | | | |
|---|---|---|---|
| DE | 3405466 A1 | | 8/1985 |
| DE | 3405466 A1 | * | 8/1985 |

(Continued)

OTHER PUBLICATIONS

"Wind Turbine Technology Overview," NYS Energy Research and Development Authority, Oct. 2005.

(Continued)

*Primary Examiner* — Edward Look
*Assistant Examiner* — Christopher R Legendre
(74) *Attorney, Agent, or Firm* — Novak Druce Connolly Bove + Quigg LLP

(57) ABSTRACT

An articulated erection structure is disclosed for use in mobilizing a wind energy extraction device. The wind turbine has blades capable of being disposed in side-by-side, parallel alignment for transportation. The erection structure has a mast that can be configured in a horizontal orientation for transportation with the turbine generator lowered, and reconfigured for power-generating operations in a vertical orientation with the turbine raised. The turbine generator may be mounted with an erection structure to a variety of transportation platforms, such as on a self-propelled vehicle, towed trailer, or transportation pallet. A hybrid system may integrate photovoltaic cells in addition to a wind energy extraction device.

22 Claims, 17 Drawing Sheets

(56) References Cited

U.S. PATENT DOCUMENTS

| | | | |
|---|---|---|---|
| 351,537 | A | 10/1886 | Simpson |
| 427,846 | A | 5/1890 | Garcia-Sanchez |
| 666,946 | A | 1/1901 | Wallace |
| 873,460 | A | 12/1907 | Sakovitch |
| 1,178,729 | A | 4/1916 | Kemble, D. |
| 1,277,181 | A | 8/1918 | Blake, C. |
| 1,518,022 | A | 12/1924 | Twiford |
| 2,094,941 | A | 10/1937 | Burkhartsmeier |
| 2,516,576 | A | 7/1950 | Jacobs |
| 4,197,056 | A * | 4/1980 | Hutter ............ 416/132 B |
| 4,310,284 | A | 1/1982 | Randolph |
| 4,360,315 | A | 11/1982 | Olson |
| 4,533,297 | A | 8/1985 | Bassett |
| 4,767,939 | A * | 8/1988 | Calley ............ 290/55 |
| 4,768,927 | A * | 9/1988 | Munk ............ 416/142 |
| 4,801,243 | A * | 1/1989 | Norton ............ 416/89 |
| 5,118,255 | A | 6/1992 | Moreno |
| 5,183,384 | A | 2/1993 | Trumbly |
| 5,226,805 | A | 7/1993 | Proven |
| 5,249,642 | A * | 10/1993 | Kishi ............ 182/2.11 |
| 5,584,655 | A | 12/1996 | Deering |
| RE38,076 | E | 4/2003 | Brennan, Jr. et al. |
| 6,726,439 | B2 | 4/2004 | Mikhail et al. |
| 6,775,608 | B2 | 8/2004 | Yasui |
| 6,833,631 | B2 | 12/2004 | Van Breems |
| 6,955,025 | B2 * | 10/2005 | Dehlsen et al. ............ 52/745.17 |
| 7,066,709 | B2 * | 6/2006 | Kim et al. ............ 415/4.3 |
| 7,105,940 | B2 | 9/2006 | Weesner et al. |
| 7,112,010 | B1 * | 9/2006 | Geiger ............ 405/195.1 |
| 7,119,453 | B2 | 10/2006 | Bywaters et al. |
| 7,192,252 | B2 * | 3/2007 | Duguet et al. ............ 416/142 |
| 7,230,819 | B2 * | 6/2007 | Muchow et al. ............ 361/601 |
| 7,323,792 | B2 | 1/2008 | Sohn |
| 7,339,286 | B1 | 3/2008 | Chen |
| 7,821,148 | B2 * | 10/2010 | Piasecki et al. ............ 290/44 |
| 8,295,033 | B2 * | 10/2012 | Van Straten ............ 361/601 |
| 8,299,645 | B2 * | 10/2012 | Muchow et al. ............ 290/55 |
| 2004/0265130 | A1 | 12/2004 | Wieser |
| 2005/0218657 | A1 | 10/2005 | Weesner et al. |
| 2006/0045743 | A1 | 3/2006 | Bertolotti et al. |
| 2006/0127210 | A1 | 6/2006 | Buttler |
| 2006/0137348 | A1 * | 6/2006 | Pas ............ 60/641.1 |
| 2006/0251516 | A1 * | 11/2006 | Sohn ............ 416/132 B |
| 2006/0260672 | A1 | 11/2006 | Niederer |
| 2007/0243063 | A1 | 10/2007 | Schellstede |
| 2008/0068782 | A1 * | 3/2008 | Muchow et al. ............ 361/601 |
| 2009/0079161 | A1 * | 3/2009 | Muchow et al. ............ 280/400 |
| 2010/0140949 | A1 * | 6/2010 | Pitre et al. ............ 290/55 |
| 2010/0143131 | A1 * | 6/2010 | Pitre ............ 416/85 |
| 2010/0207452 | A1 * | 8/2010 | Saab ............ 307/65 |
| 2010/0301607 | A1 * | 12/2010 | Morimoto ............ 290/44 |
| 2011/0146751 | A1 * | 6/2011 | McGuire et al. ............ 136/245 |
| 2011/0211957 | A1 * | 9/2011 | Folsom et al. ............ 416/41 |
| 2012/0007365 | A1 * | 1/2012 | Harrison et al. ............ 290/55 |
| 2012/0026320 | A1 * | 2/2012 | Bryceland et al. ............ 348/135 |
| 2013/0002189 | A1 * | 1/2013 | Van Straten ............ 320/101 |

FOREIGN PATENT DOCUMENTS

| | | |
|---|---|---|
| DE | 19646612 C1 * | 3/1998 |
| EP | 1035325 A1 | 9/2000 |
| EP | 1498604 A1 | 1/2005 |
| FR | 2614368 A1 * | 10/1988 |
| GB | 2329534 A | 3/1999 |
| JP | 56041467 A | 4/1981 |
| JP | 2003028045 A | 1/2003 |
| KR | 200408178 Y1 | 2/2006 |
| KR | 100720287 B1 | 5/2007 |
| SU | 1546700 A * | 2/1990 |
| WO | WO-0192721 A1 | 12/2001 |
| WO | WO-03008803 A1 | 1/2003 |
| WO | WO-2005100786 A1 | 10/2005 |
| WO | WO-2006031369 A2 | 3/2006 |
| WO | WO-2008091162 A1 | 7/2008 |
| WO | WO 2010037005 A2 * | 4/2010 |

OTHER PUBLICATIONS

"20% Wind Energy by 2030: Increasing Wind Energy's Contribution to U.S. Electricity Supply," U.S. Department of Energy, Jul. 2008.

Lee et al., "Alternative Energy Issues and Concerns for Extreme Weather Conditions," Critical Power Solutions Intl., Mar. 2008.

"Whisper 175 Wind Turbine," Temiskaming Independent Energy, date unknown. http://www.tempower.com/wind/whisper175.html.

International Search Report and Written Opinion, International Application No. PCT/US09/04769, dated Apr. 7, 2010.

International Preliminary Report on Patentability, International Application No. PCT/US09/04769, dated Feb. 22, 2011.

Blade Technology, "Proven Engineering Products Ltd." May 31, 2005.

International Search Report and the Written Opinion, International Application No. PCT/US2009/004768, dated Mar. 25, 2010.

* cited by examiner

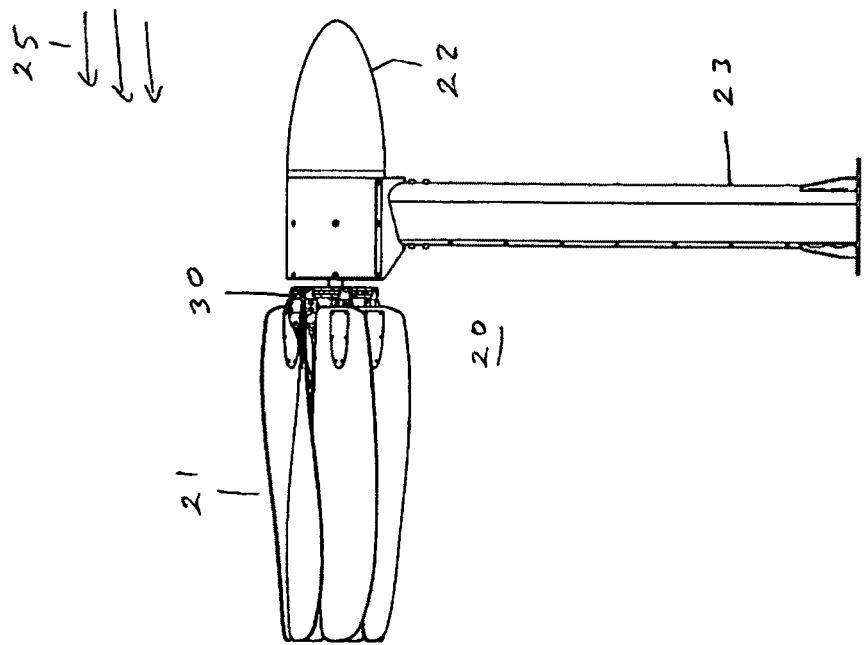
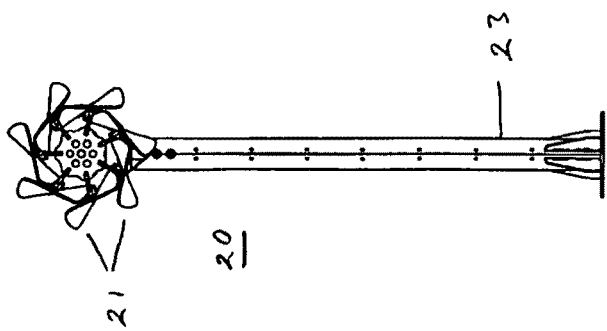
FIG. 3B
FIG. 3A

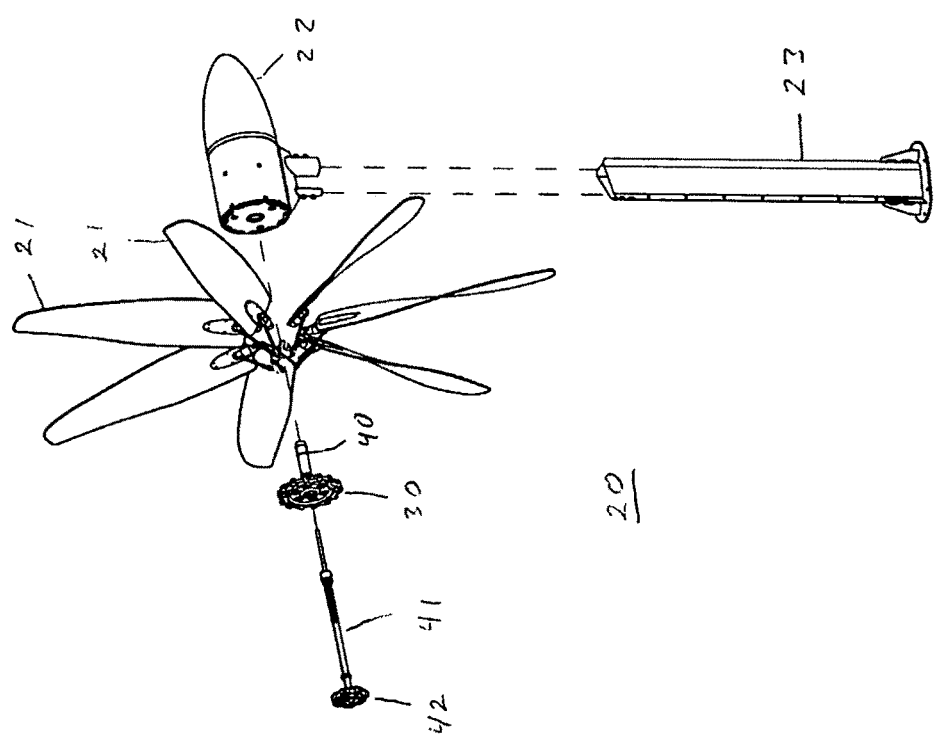

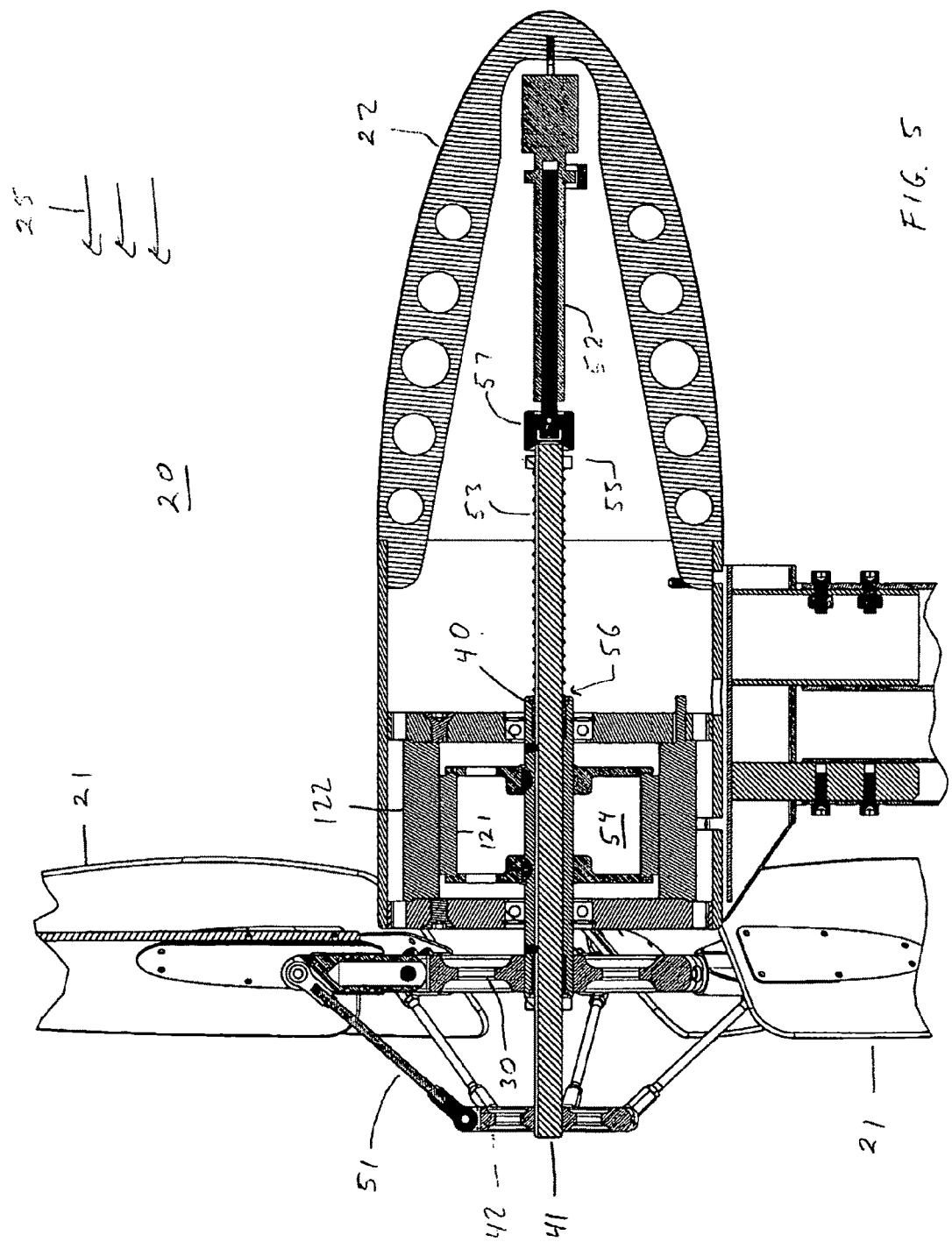

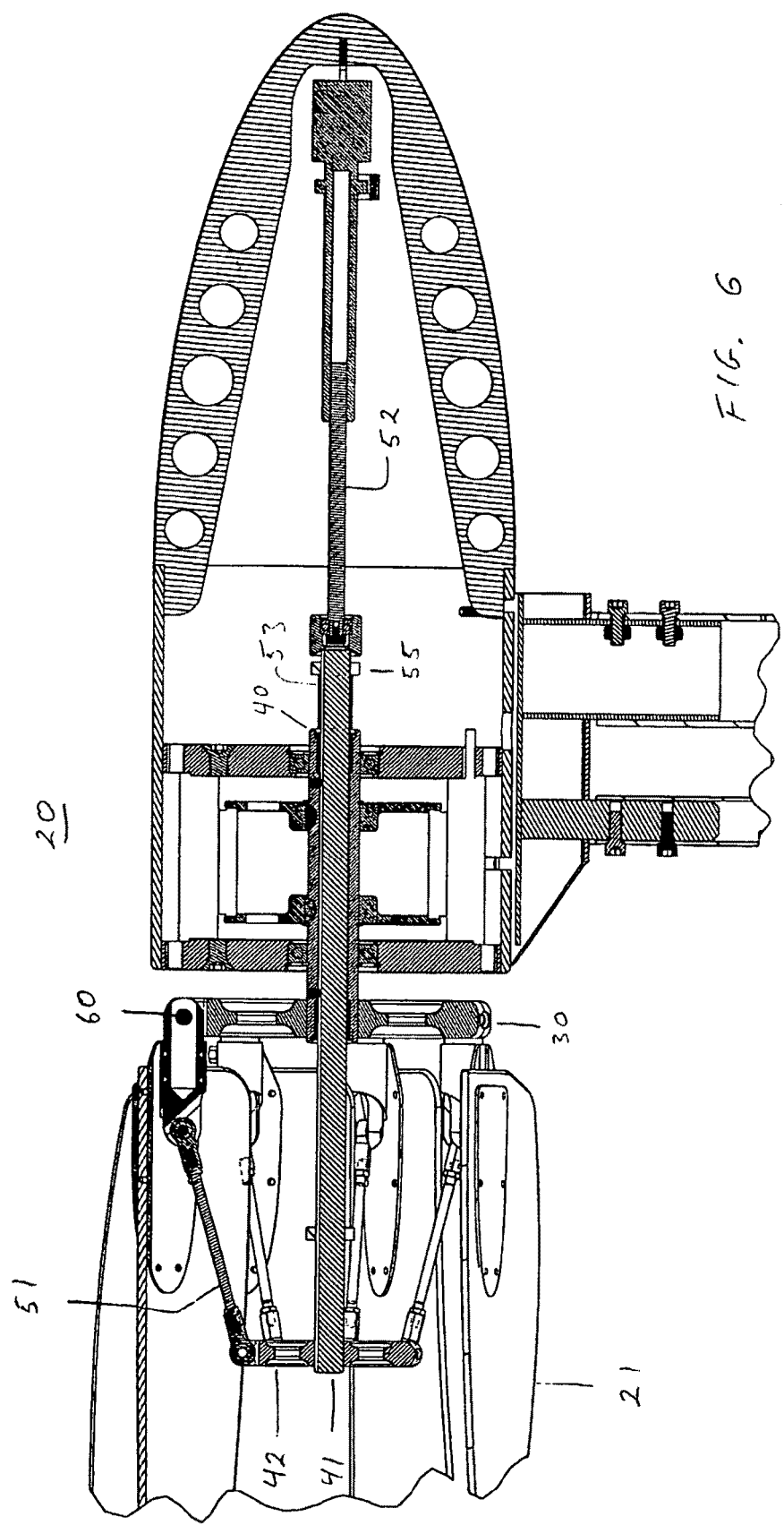

MOBILE WIND TURBINE

CROSS-REFERENCE TO RELATED APPLICATIONS

This application references and claims priority to U.S. Provisional Patent Applications 61/189,950 entitled, "Fine Arts Innovations," and filed Aug. 22, 2008, 61/202,189 entitled, "Folding Blade Turbine," and filed Feb. 4, 2009, 61/213,597 entitled "Mobile Wind Turbine," and filed Jun. 23, 2009, the contents of which are incorporated herein by reference in their entireties.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

According to the U.S. Department of Energy, modern, wind-driven electricity generators were born in the late 1970's. See "20% Wind Energy by 2030," U.S. Department of Energy, July 2008. Until the early 1970s, wind energy filled a small niche market supplying mechanical power for grinding grain and pumping water, as well as electricity for rural battery charging. With the exception of battery chargers and rare experiments with larger electricity-producing machines, the windmills of 1850 and even 1950 differed very little from the primitive devices from which they were derived. As of July 2008, wind energy provides approximately 1% of total U.S. electricity generation.

As illustrated in FIG. 1, most modern wind turbines typically have 3-bladed rotors 10 with diameters of 10-80 meters mounted atop 60-80 meter towers 12. The average turbine installed in the United States in 2006 can produce approximately 1.6 megawatts of electrical power. Turbine power output is controlled by rotating the blades 10 around their long axis to change the angle of attack (pitch) with respect to the relative wind as the blades spin around the rotor hub 11. The turbine is pointed into the wind by rotating the nacelle 13 around the tower (yaw). Turbines are typically installed in arrays (farms) of 30-150 machines. A pitch controller (for blade pitch) regulates the power output and rotor speed to prevent overloading the structural components. Generally, a turbine will start producing power in winds of about 5.36 meters/second (12 miles per hour) and reach maximum power output at about 12.52-13.41 meters/second (28-30 miles per hour). The turbine will pitch or feather the blades to stop power production and rotation at about 22.35 meters/second (50 miles per hour).

In the 1980s, an approach of using low-cost parts from other industries produced machinery that usually worked, but was heavy, high-maintenance, and grid-unfriendly. Small-diameter machines were deployed in the California wind corridors, mostly in densely packed arrays that were not aesthetically pleasing in such a rural setting. These densely packed arrays also often blocked the wind from neighboring turbines, producing a great deal of turbulence for the downwind machines. Little was known about structural loads caused by turbulence, which led to the frequent and early failure of critical parts. Reliability and availability suffered as a result.

SUMMARY

An objective of the invention is to provide a wind power extraction device adapted for ease of transportation, set-up, and relocation. Other objectives of the invention include:
1. providing a mobile wind power extraction device suitable for locations of moderate wind;
2. providing a mobile wind power extraction device having high survivability in high winds;
3. providing an erection structure adapted for ease of transportation, set-up, and relocation with a wind power extraction device; and
4. providing methods for rapid deployment of wind power extraction devices.

These and other objectives are achieved by providing a wind power extraction device with blades capable of being positioned in side-by-side parallel alignment for transportation. Such a wind power extraction device preferably is mounted to an articulated erection structure having a transportation configuration and an operation configuration. The erection structure may be mounted to a platform suitable for transportation.

An exemplary wind power extraction device is an axial flow (sometimes called horizontal axis) wind turbine with blades adapted to rotate during operation about an axis that is aligned generally in parallel with the direction of a prevailing wind. The long axis of the blades of such a wind turbine typically are at right angles to the axis of rotation. The blades may be folded, rotated, or otherwise configured with their long axis in side-by-side, parallel alignment for transportation and/or for protection from strong violent winds (storms).

An exemplary erection structure has a mast capable of being configured in a vertical orientation that elevates the wind power extraction device above the transportation platform for operations. The mast also may be reconfigured for transportation in a horizontal orientation with the wind power extraction device lowered to the proximity of the transportation platform.

Exemplary transportation platforms include self-propelled trucks, towed trailers, and transportation pallets and boats. One particularly advantageous pallet has the form factor of a container roll-in/roll-out pallet ("CROP"). The pallet with associated erection structure and wind energy extraction device may be inserted into an ISO shipping container for multi-modal transportation and/or transported by trailer or self-propelled vehicle.

BRIEF DESCRIPTION OF THE SEVERAL VIEWS OF THE DRAWING

Reference will be made to the following drawings, which illustrate, preferred embodiments of the invention as contemplated by the inventor(s).

FIGS. 3a and 3b are rear and side views respectively of a folding-blade turbine with blades in the fully folded position.

FIG. 4 is an exploded view of major assemblies of a folding-blade turbine.

FIG. 5 is a partial sectional view of a turbine generator showing blades in the fully extended position.

FIG. 6 is a partial sectional view of a turbine generator showing blades in the fully folded position.

DETAILED DESCRIPTION OF THE INVENTION

Figure 1:
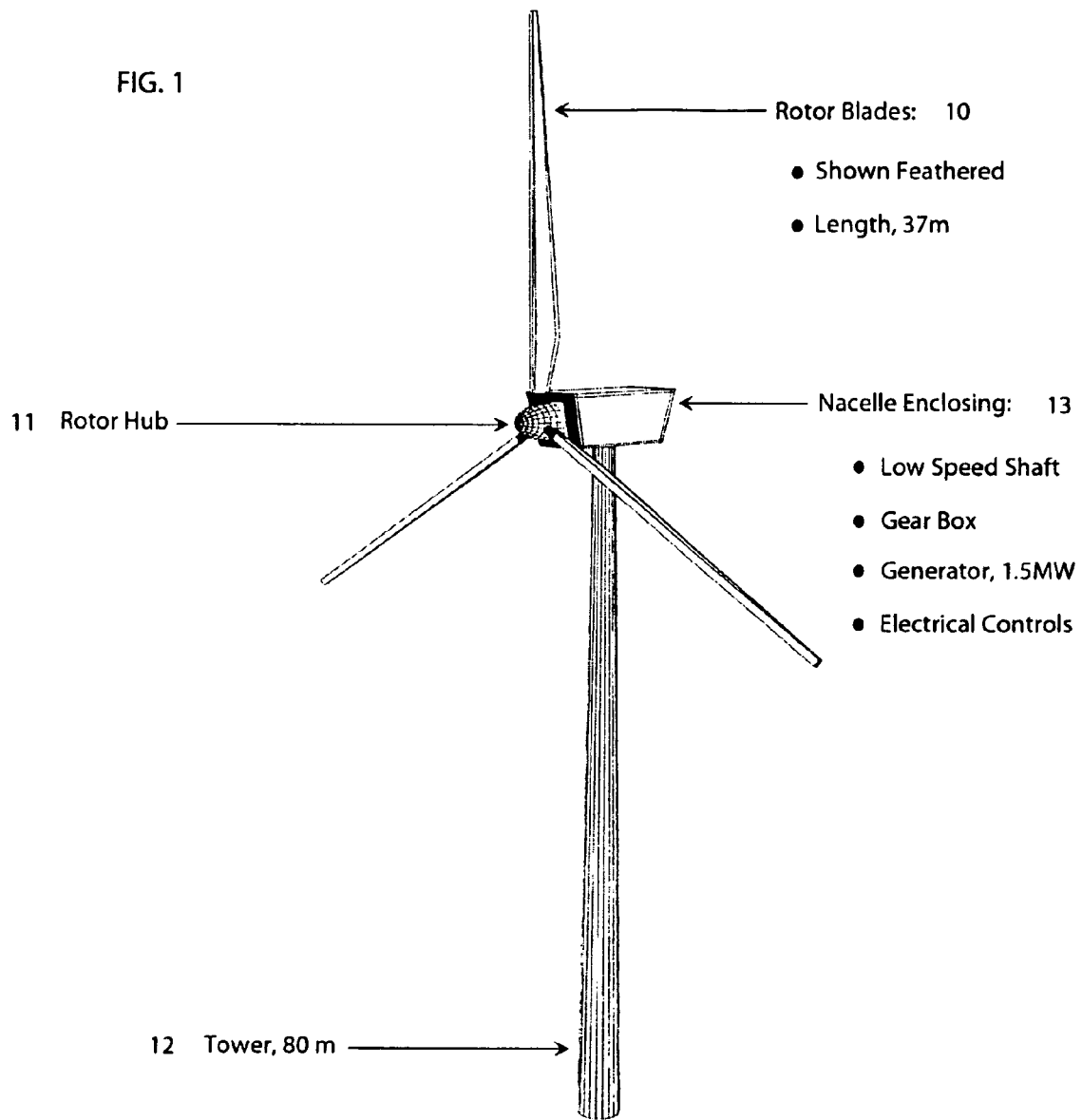
FIG. 1 illustrates a prior art wind turbine.
Figure 2B:
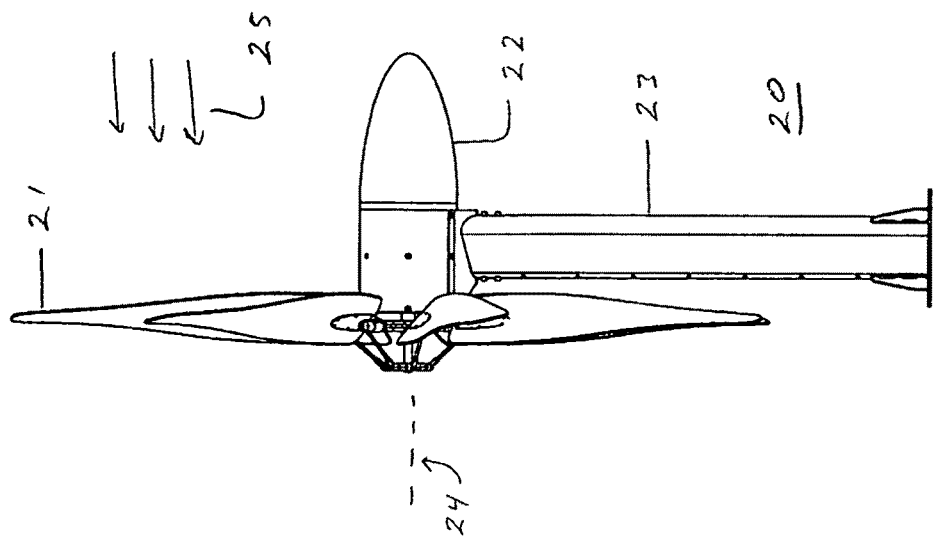
FIGS. 2a and 2b are rear and side views respectively of a folding-blade turbine generator with blades in the fully extended position.
Figure 2A:
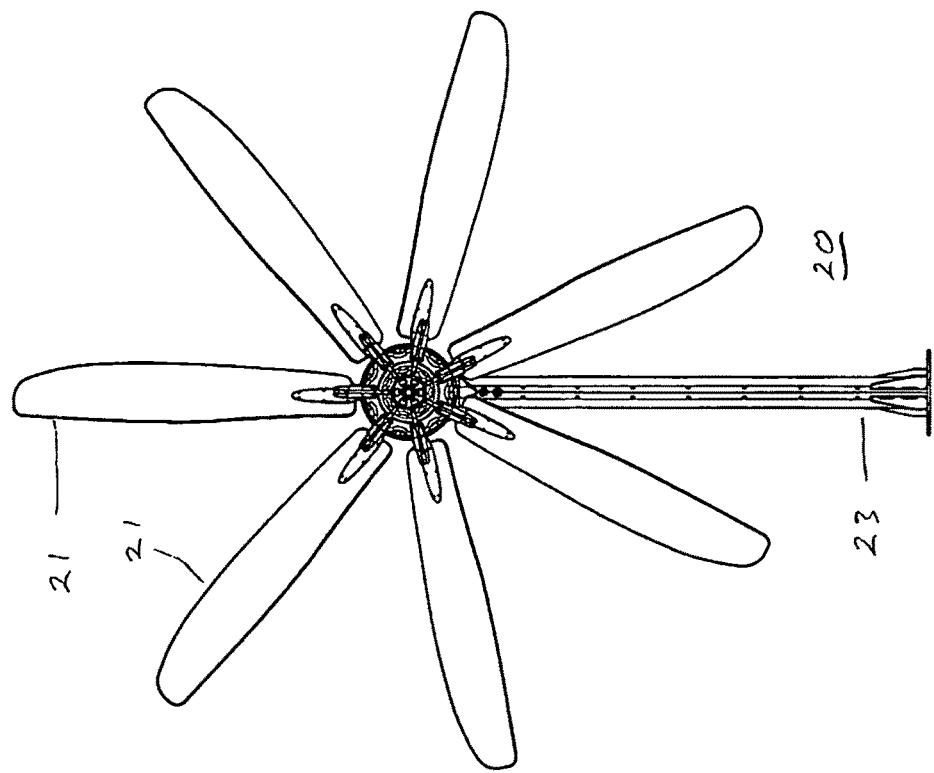

FIGS. 2a and 2b are rear and side views respectively of an exemplary, folding-blade turbine generator 20 with turbine blades 21 in the fully extended position. The turbine generator includes blades 21 mounted to a shaft (not shown) that is coupled within a nacelle 22 to an electrical generator. While the turbine generator of FIGS. 2a and 2b contemplate an electrical generator mounted within the nacelle, a turbine generator may include a transmission system coupling blades to a generator outside the nacelle 22. The nacelle 22 is illustrated as mounted to a non-articulated mast 23, however, an alternate mounting with an articulated erection structure will be described in greater detail below in connection with FIGS. 7-14.

The turbine blades 21 are airfoils shaped to generate a torque about an axis of rotation 24 in the presence of a prevailing wind 25. The turbine generator shown in FIGS. 2a and 2b may be called an "axial-flow" turbine in that the blades are shaped to rotate when the direction of the prevailing wind 25 is aligned with the axis of rotation 24 without substantially re-directing the general direction of the prevailing wind. The turbine generator shown in FIGS. 2a and 2b also may be called a horizontal axis wind turbine in that the axis of rotation is horizontal during normal operation. Preferably, the blades are shaped for nominal operation when positioned on the downwind side of the nacelle 22. (The terms "forward" and "rearward" in this description refer to upwind and downwind directions respectively when the turbine generator is in this nominal operating position. For example, in normal operation, the blades 21 are "rearward" and "downwind" of the nacelle 22. This designation is for convenience of description only and not intended to limit the scope of the invention.) In the fully extended position, the long axis of the blades along the airfoil span is in a normal direction (right angle) to the direction of the prevailing airflow.

FIGS. 3a and 3b are rear and side views respectively of an exemplary, folding-blade turbine generator 20 with turbine blades 21 in the fully folded position. Here, the long axis of the blades 21 are parallel to the axis of rotation, which also is generally parallel or in line with the direction of the prevailing wind. Each blade 21 is pivotally mounted to a drive hub 30 that rotates with the blades 21. Blades may pivot between extended and folded positions while rotating, as discussed more fully below.

FIG. 4 is an exploded perspective view of major assemblies of the turbine generator 20 of FIGS. 2a, 2b, 3a, and 3b. In addition to previously mentioned blades 21, nacelle 22, mast 23 and drive hub 30, this figure illustrates drive shaft 40, sliding shaft 41, and sliding hub 42. The blades 41 mount pivotally to drive hub 30, which in turn is welded or otherwise affixed to drive shaft 40. Drive shaft 40 in turn is mounted with bearings within the nacelle 22.

FIG. 5 is a partial sectional view of an exemplary turbine generator 20 showing nacelle 22, drive hub 30, drive shaft 40, sliding shaft 41, and sliding hub 42 with blades 21 in the fully extended position. The sliding shaft 41 is longer than, and concentric with, drive shaft 40. The sliding shaft extends beyond the drive shaft 40 in both the forward (upwind into nacelle 22) and rearward (downwind out of nacelle 22) directions. The sliding hub 42 attaches to the rearward end of sliding shaft 41 on the rearward (downwind) side of drive hub 30. The forward end of sliding shaft 41 couples to an actuator (not shown), which is discussed further below. Tie rods 51 connect sliding hub 42 to blades 21, as will be discussed in further detail below. A generator assembly 54 couples both to the nacelle 22 and to the drive shaft 41, as also will be discussed in further detail below. A spring 53 mounts around the sliding shaft 41 between (i) a forward collar 55 fixed to the sliding shaft 53 near the sliding shaft forward end, and (ii) a seat 56 near the forward end of drive shaft 40. An actuator 52 couples to the forward end of sliding shaft 53, as will also be discussed further below. The actuator is of the linear type with a central shaft that extends and retracts along its long axis, which in the orientation of FIG. 5 is coaxial with sliding shaft 53. Shown with blades in the fully extended position, this figure shows the actuator 52 in a retracted position and sliding shaft 41 in a relatively forward position when compared with FIG. 6. The spring 53 is under relatively mild compression, which biases the sliding shaft forward against a thrust bearing 57 mounted to the rearward end of the actuator 52.

FIG. 6 is a partial sectional view of an exemplary turbine generator 20 showing blades 21 in the fully folded position. Here, actuator 52 is extended in the rearward direction, as are sliding shaft 41 and sliding hub 42 when compared to their positions in FIG. 5. Tie rods 51 are displaced rearward and inward. Blades 21 are pivoted about their drive-hub connections 60 to the folded position. Spring 53 is relatively highly compressed. Drive shaft 40 and drive hub 30 maintain the same axial position relative to those shown in FIG. 5.

An exemplary turbine may have 7 blades approximately 51 inches in length, tie rods approximately 9 inches in length, a sliding shaft approximately 28 inches in length, a drive shaft approximately 12 inches in length, a stepper-motor actuator model number D-B.125-HT23-8-2N0-TSS/4 with an eight-inch stroke made by Ultra Motion of Cutchogue, N.Y., and an alternator assemble model number 300STK4M made by Alxion Automatique of Colombes, France. This example is not meant to be limiting of the invention, which may be scaled and adapted for a wide variety of wind resources and applications. The actuator 52 may be hydraulic or pneumatic or screw jack type. The Ultra Motion actuator mentioned above has adjustable sensors indicating stop positions at the full open and full closed positions. Additional sensors, or alternate actuators, may be used to provide an electronic measure of shaft position, which in turn is a measure of blade fold angle.

It is believed that operation of the exemplary, folding-blade turbine generator 20 is self-evident from the structure and description above; nevertheless, several observations will be made here to facilitate understanding.

FIG. 5 illustrates a turbine generator with blades 21 in the fully-extended position. Nominally, the nacelle 22 and blades 21 would be oriented so that the direction of a prevailing airflow 25 is generally parallel to the blade rotational axis, which is the rotational axis of the sliding shaft 41 and drive shaft 40. The blades 21 preferably will be on the downwind of the nacelle 22. The aerodynamic shape of the blades 21 causes them to generate a torque about the rotational axis, which in turn rotates the drive hub 30, drive shaft 40, and rotor 121. The rotating fields of the rotor magnets induce electric currents in the coils of the stator 122.

The blades preferably are shaped to be efficient at extracting energy from winds typically blowing at the installation site. The spring 53 preferably is sized to hold the blades 21 in the open position for winds up to a maximum nominal speed corresponding to the turbine generator rated operating speed. In more detail, the spring 53 biases the sliding shaft 41 forward, which in turn biases the sliding hub 42 forward and biases the tie rods 51 outwards. As wind speeds exceed the maximum nominal speed, the axial aerodynamic load on the blades 21 overcomes the force of the spring 53, and the blades will fold. The folding of blades 21 alters the overall geometry of the turbine. As can be seen by comparing FIGS. 2a and 3a, the folding of blades 21 reduces the turbine's exposed cross-section. This folding reduces the area of blades 21 exposed to the wind, which in turn reduces the aerodynamic loading to a point that balances the force of the spring 53. Hydraulic damping may be provided to minimize oscillation. In partially- or fully-folded positions, the blades 21 may continue to absorb energy from the prevailing wind and hence maintain operation. The sliding shaft 41 continues to rotate because screws and or keys (FIG. 7, item 77) riding in the slot (FIG. 8, item 84) of the sliding shaft 41 continue to lock the sliding shaft 41 rotationally to the drive shaft 40. The turbine airfoils may be shaped with relatively high exposed areas for operation at relatively low winds, and they can be folded to maintain a rated level of power extraction at high winds without being overpowered or damaged.

The actuator 52 may also be used to fold the blades from the fully-extended position toward the fully-folded position as shown in FIG. 6, or any position in between. This activity may be reversed to open the blades from the folded position back to the opened position. The actuator 52 may be controlled in a variety of modes. In a first mode, the actuator 52 may be operated manually to set the blades at a desired fold angle. This mode is desirable for maintenance, transport, and diagnostic operation. In a second mode, the turbine generator may monitor rotational speed of the rotating shaft and fold the blades to prevent unsafe operation, such as over speed. Other safety parameters may be monitored, such as alternator temperature or electrical output level.

Additional information about a folding blade turbine may be found in U.S. Provisional Patent Application 61/202,189 entitled, "Folding Blade Turbine," and filed Feb. 4, 2009, the contents of which is incorporated herein by reference in its entirety.

Figure 7:
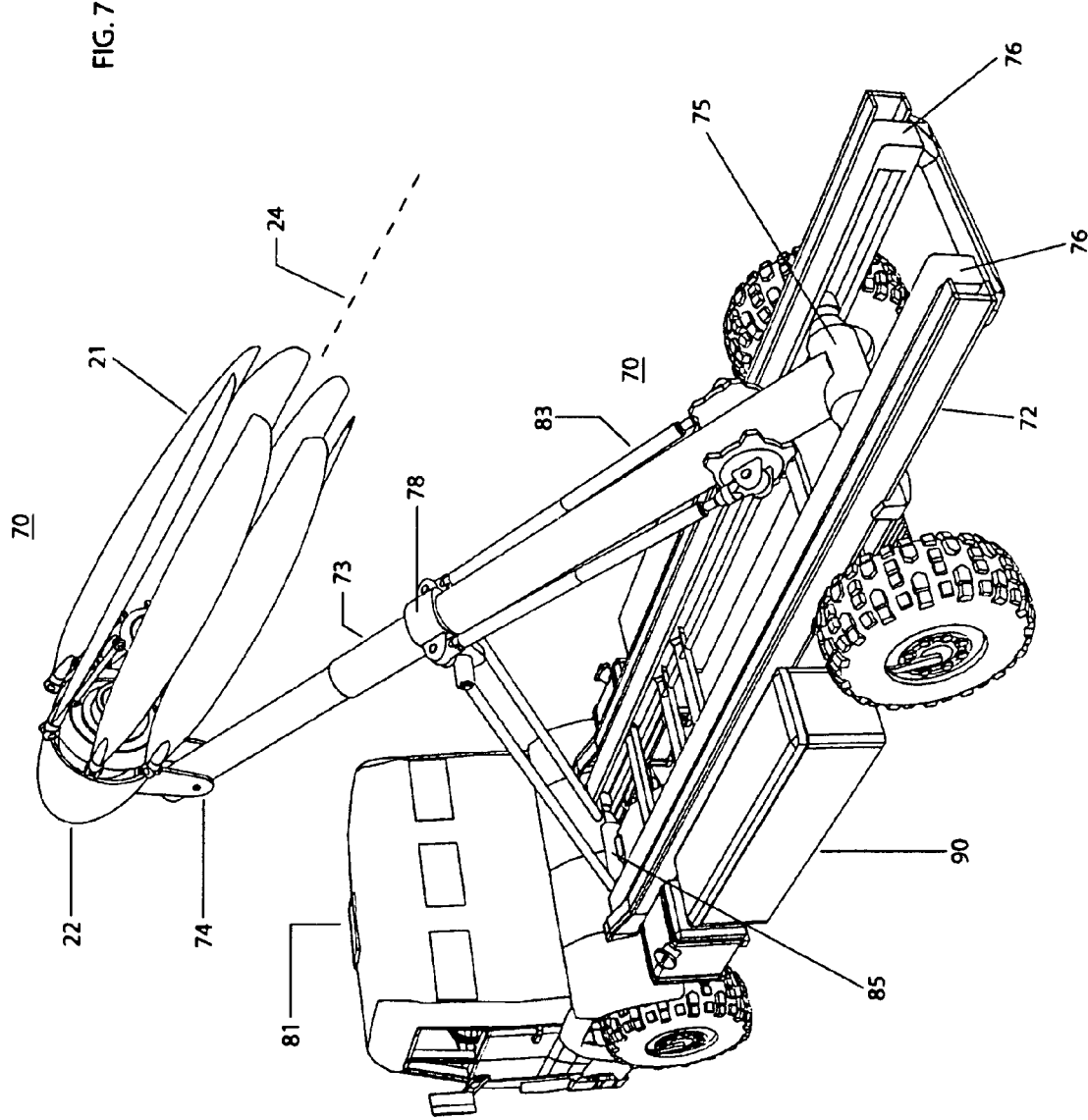
FIG. 7 is a perspective view of an exemplary, partially-erected, transportable turbine generator with articulated erection structure mounted on a self-propelled vehicle.

FIG. 7 is a perspective view of an exemplary, partially-erected, transportable turbine generator 70 having the same general construction as the one described above in connection with FIGS. 2-6, but with an articulated erection structure in place of the mast 23. The turbine generator includes a nacelle 22 and folding blades 21 which, in operation, rotate about an axis 24 as described above. This view shows the blades 21 in a fully folded orientation.

The articulated erection structure includes an elongated mast 73 coupled at a top end to the nacelle 22 through a pivotal joint 74. The mast 73 may be made of multiple, telescoping sections. The pivotal joint 74 allows the nacelle to pivot so that the axis of the blades 24 can swing from a first position generally at right angles to the centerline of the mast to a second position generally parallel to the centerline of the mast. The mast 73 couples at the base end (opposite the top end) to a sliding axel 75. The sliding axel 75 sits transversely between two parallel, horizontal rails 76. The illustrated rails 76 have a generally "C" shaped cross section, but other rail configurations may be used, such as round rails with over sliding carriages. The sliding axel 75 is generally cylindrical with ends that engage the open sides of the rails 76 so that the sliding axel 75 may both (i) rotate about an axis transverse to the two rails 76, and (ii) translate in a line parallel to the two rails 76. The parallel rails 76 in turn mount to, or are otherwise made integral with, the bed 72 of a self-propelled truck 79 such that the rails 76 and the line of motion of the sliding axel 75 are parallel to the long axis of the truck bed 72. Two pivot arms 77 each connect pivotally at a top end to a collar 78 fixed partially along the length of the mast 73. The base ends of the pivot arms 77 (opposite the top ends) each connect pivotally to a point generally at an end of the rails 76, such as to a fixed axel 85 that is allowed to rotate about an axis transverse to the parallel rails 76 but not translate along the parallel rails 76.

Figure 8:
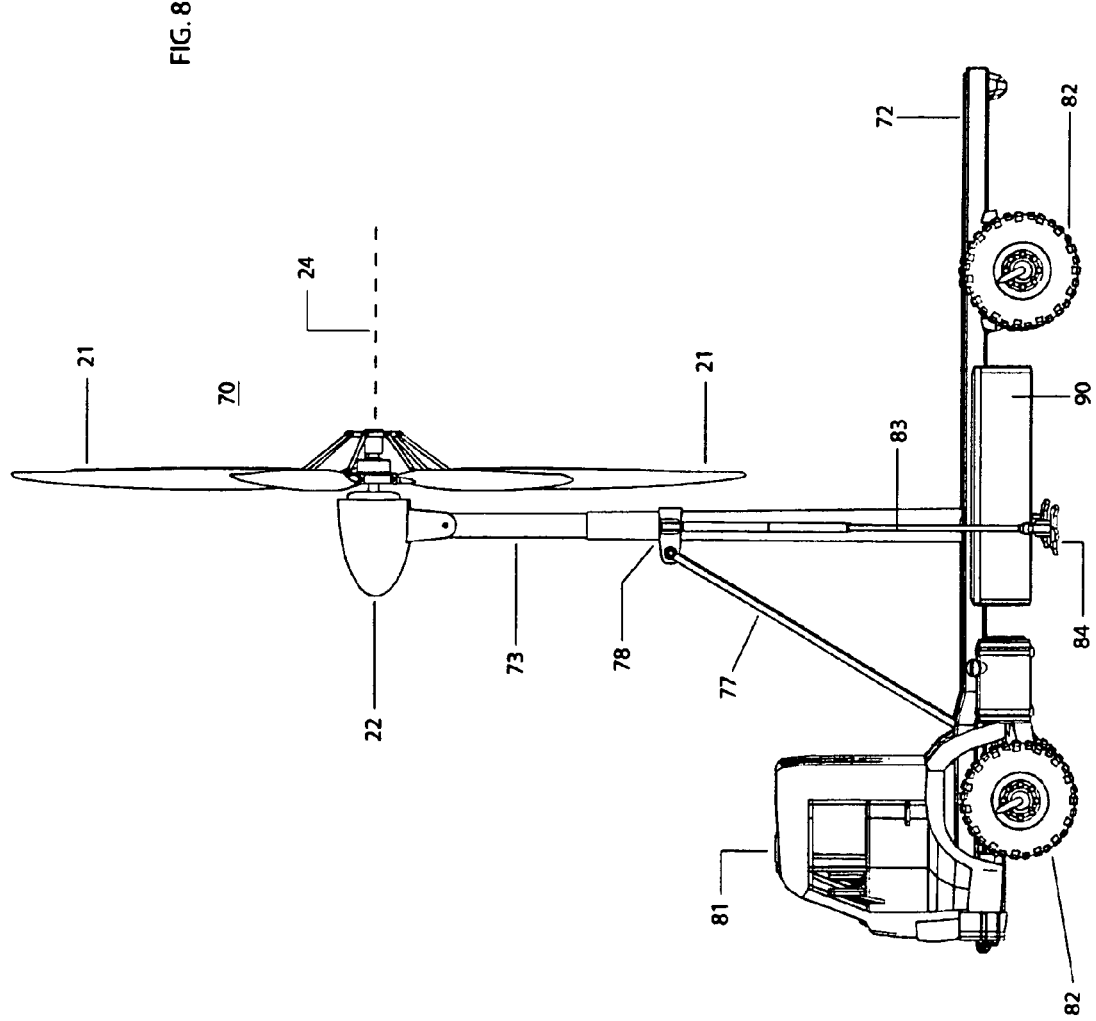
FIG. 8 is a side view of the turbine generator of FIG. 7 in an erected position for operation.

FIG. 8 is a side view of the turbine generator 70 of FIG. 7 in an erected position for operation. This view shows the mast 73 in a substantially vertical orientation, the blades 21 in the fully open position, and the blade axis of rotation 24 generally horizontal and at a right angle to the long axis of the mast 73. In this view, the truck bed 72 partially obscures the rails 76 and sliding axel 75, but from the orientation of the mast 73 it should be understood that that sliding axel 75 is at a point in the forward half of the rails (the half closer to the truck cab 81), in this case about mid way between forward and aft sets of truck wheels 82. The pivot arms 77 form a reinforcing triangle to brace the mast 73 in the vertical position. A locking mechanism (not shown) locks the sliding axel with the mast 73 in the vertical position for turbine operation. Two side arms 83 connect pivotally to the mast 73 at the collar 78. When the mast 73 is erected to the vertical position, the side arms 83 swing laterally (in a line at right angles to the long axis of the truck bed) away from the mast 73. Base plates 84 provide a contact surface on the ground away from the centerline of the truck to form a reinforcing triangle to brace the mast 73. For convenience of illustration, FIG. 8 shows the nacelle 22 elevated to a height approximately equal to the truck length, but it should be understood that the mast 73 may telescope or otherwise extend to position the nacelle higher above the ground speed winds is desired.

Figure 9:
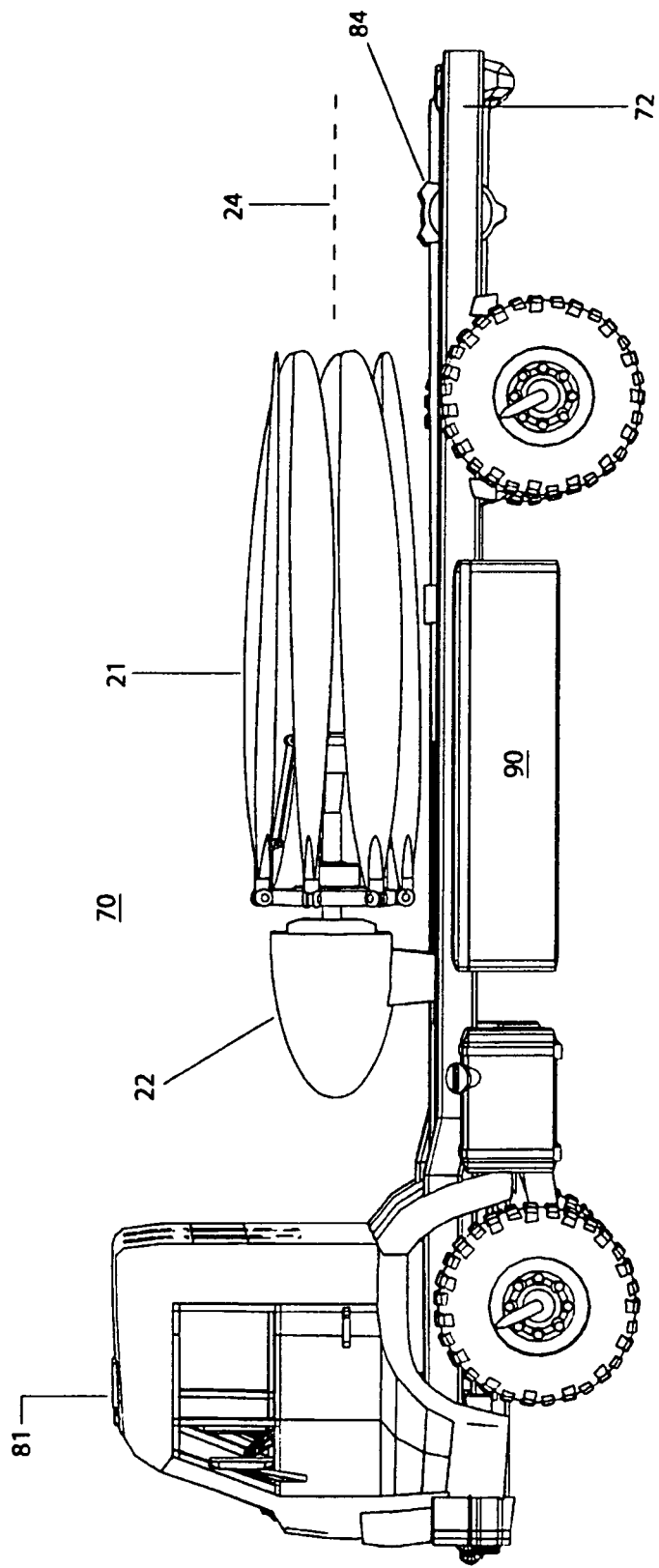
FIG. 9 is a side view of the turbine generator 70 of FIG. 7 in a stowed position for transportation.

FIG. 9 is a side view of the turbine generator 70 of FIG. 7 in a stowed position for transportation. In this view, the mast 73 (not shown but visible in FIG. 7) has rotated and lowered to a substantially horizontal position between the rails 76 (not shown but visible in FIG. 7). The blades 21 are fully closed with their axis of rotation 24 generally horizontal. In this position, with bases of the blades attached to the hub, the blades are in side-by-side, parallel alignment with one another. The side arms 83 have been retracted, swung to positions parallel to the mast, and also positioned between the rails. One or more equipment boxes 90 may be provided to house ancillary equipment, such as rectifiers, AC inverters, switches, distribution panels, cables, batteries, maintenance tools, etc.

It is believed that operation of the exemplary, transportable turbine generator 70 is self-evident from the structure and description above; nevertheless, several observations will be made here to facilitate understanding. As illustrated in FIG. 7, the mast 73 has a base coupled to a sliding axel 75 held between parallel rails 76. The mast 73 also couples through collar 78 to pivot arms 77 having their base ends in pivotal but otherwise fixed positions near the cab 81 of the truck 79. The pivot arms 77 are rigid and constrain the collar 78 to maintain a fixed radius from the pivot arm connection point near the cab 81 of the truck 79. As the sliding axel 75 moves from a position at an end of the rails toward the center, the collar 77 rises, and the mast rotates to a vertical position. In addition, pivotal joint 74 connecting the mast 73 to the nacelle 22 allows the nacelle to rotate, which brings the blade axis of rotation 24 into a horizontal orientation when the mast 73 has been raised or lowered.

The motive force for raising and lowering the mast may be any of a variety of means, such as electromechanical (e.g., worm screw and electric motor coupled to the sliding axel), hydromechanical (e.g., hydraulic cylinder coupled to the pivot arms), or purely mechanical (e.g., mechanically linking the sliding axel to a winch on the truck). An external motive system may be provided, such as an erection crane attached to a suitable hoist point on the mast 73 or nacelle 22. Alternately, the truck cab may be decoupled and used to pull the mechanism to an erect position. Preferably, the mechanism for moving the sliding axle 75 will include a locking mechanism to hold the sliding axle 75 in each of several positions, such as a position with the turbine generator 70 raised for operations, or a position with the turbine generator 70 lowered for transportation. For example, if a worm screw is provided for moving the sliding axle 75, the worm screw preferably would also include a locking mechanism for locking the screw—and hence the sliding axle 75—in positions for operation and transport. In the absence of any other mechanism, the sliding axle 75 and rails 76 each may have vertical holes adapted and aligned to receive a manually-inserted locking pin.

The motive force for rotating the nacelle 22 may be any of a variety of means. A suitable mechanism would include a hydraulic cylinder mounted to the nacelle 22 and positioned to rotate the nacelle 22 about the pivotal joint 74. The hydraulic cylinder may be controlled to rotate the nacelle concurrently with the raising or lowering of the mast 73, such as to hold the blade axis of rotation constantly horizontal during while the mast 73 rotates between vertical and horizontal positions. Alternately, the hydraulic cylinder can be controlled to rotate the nacelle 22 in a separate action at the beginning or end of the process of rotating the mast 73. The nacelle 22 may be provided with a solenoid-operated locking pin that controllably engages and disengages with mating hole on the mast 73 to lock the nacelle 22 into positions for operations and/or transport. Alternately, a rigid or extensible push rod may be connected between the nacelle 22 and the sliding axle 75. The push rod would be pivotal at its attachment to the sliding axle 75 and form a parallelogram with mast 73. When the mast 73 is raised to a vertical position (such as by a worm screw operating on the sliding axle 75), the push rod would position the nacelle 22 in an orientation with the blade axis of rotation 24 at right angles to the long axis of the mast 73. When the mast 75 is lowered to a horizontal position for transportation, the push rod would rotate the nacelle 22 to an orientation with the blade axis of rotation 24 generally parallel to the long axis of the mast 73.

Figure 10:
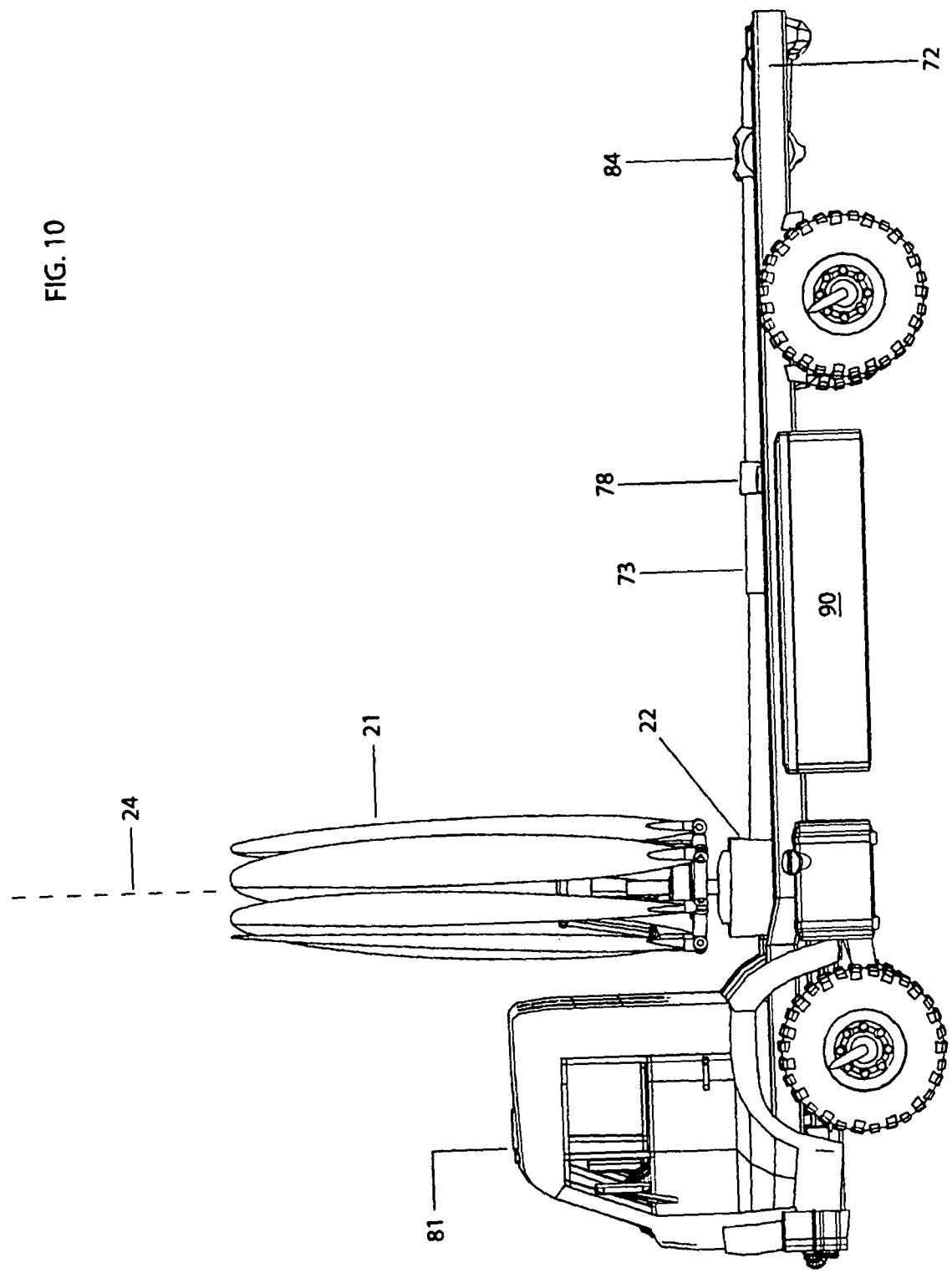
FIG. 10 is a side view of an alternate turbine generator with an articulated erection structure mounted on a self-propelled vehicle in a stowed position for transportation.

FIG. 10 is a side view of an alternative embodiment of a turbine generator in a stowed position that is generally identical to the one shown in FIGS. 7-9 but omitting the pivotal joint 74 between the mast 73 and the nacelle 22. In the absence of the pivotal joint 74, the blade axis of rotation 24 remains at right angles to the mast 73 so that, when the mast is lowered to a horizontal position, the blade axis of rotation is substantially vertical. This embodiment also includes an erection structure having mast 73, pivot arms (not shown), collar 78, sliding axle (not shown), rails (not shown), side arms (not shown) and base plates 84 that operate substantially identically as in the embodiment of FIGS. 7-9.

Figure 11:
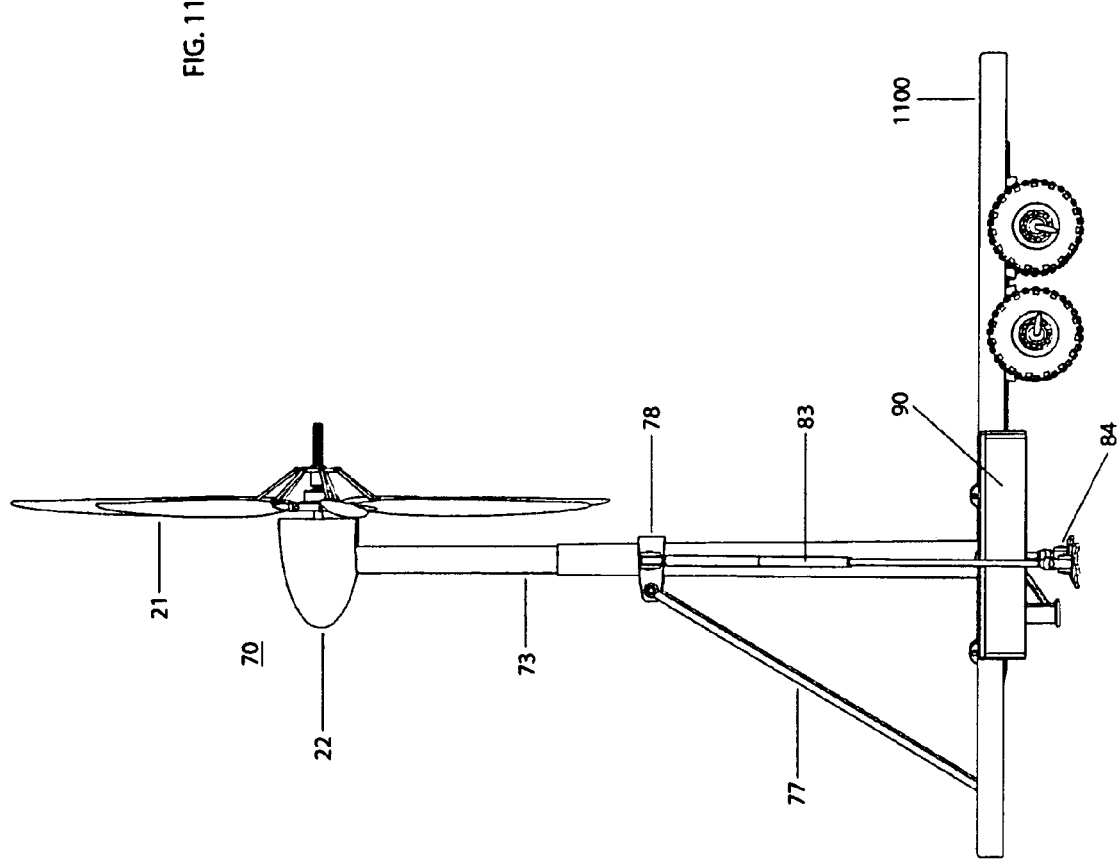
FIG. 11 is a side view of a turbine generator with an articulated erection structure in the erected position for operation on a towed trailer.
Figure 12:
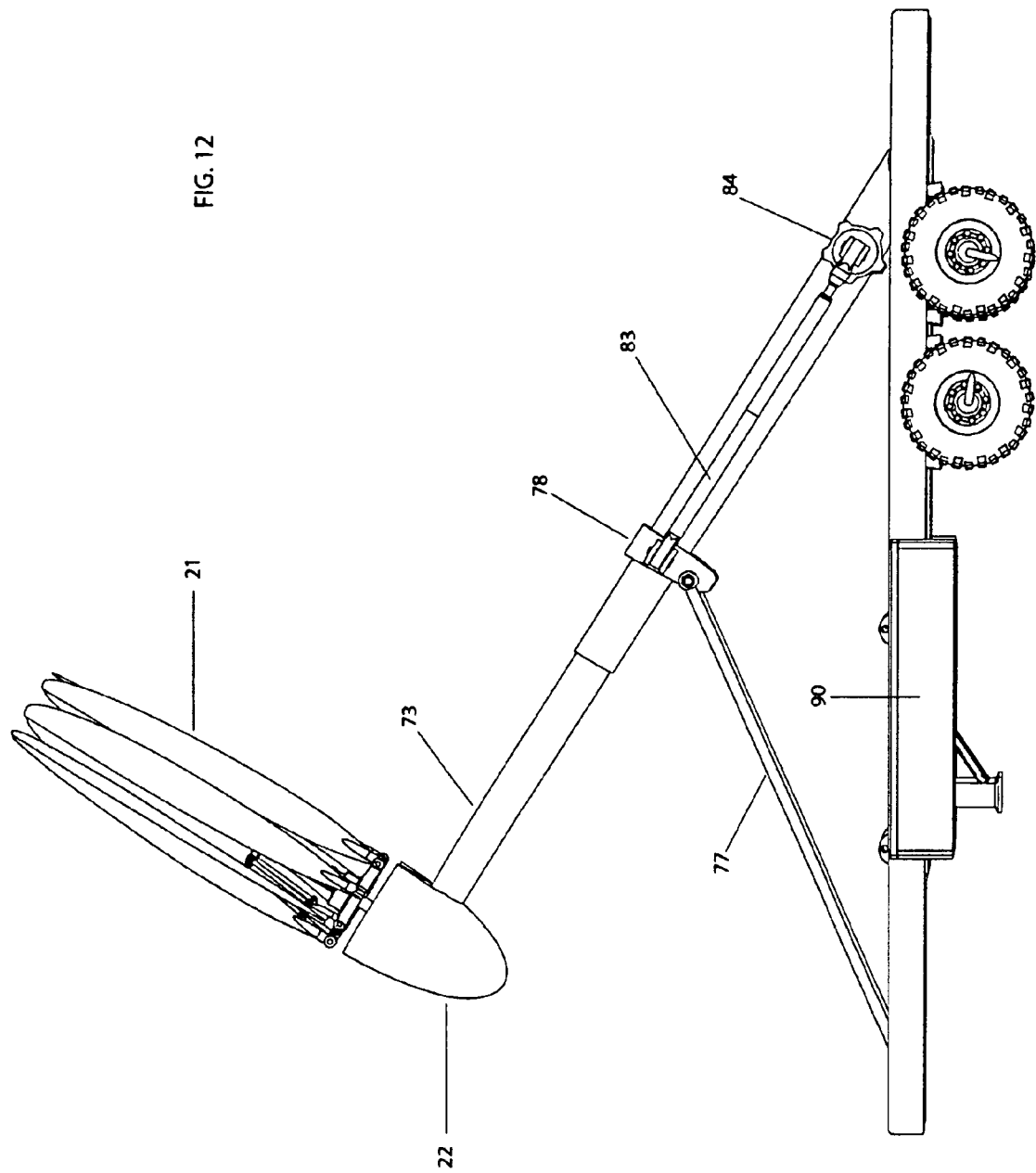
FIG. 12 is a side view of the turbine generator of FIG. 11 in a partially erected position.

FIG. 11 is a side view of an alternative embodiment of a turbine generator 70 in the erected position that is generally identical to the one shown in FIG. 10 but using a towed trailer instead of a self-propelled vehicle. This embodiment includes blades 21, nacelle 22, mast 73, pivot arms 77, side arms 83 with base plates 84, sliding axle (not shown), rails (not shown), and equipment boxes 90 that operate substantially identically as in the embodiment of FIG. 10. Rails (not shown) mount to the bed 1100 of the trailer. The trailer includes an extensible leg 1102 for supporting and leveling the forward end of the trailer when detached from a towing vehicle. FIG. 12 is a side view of the mobile wind turbine of FIG. 11 but in a partially erected position. The embodiment of FIGS. 11 and 12 may be adapted with a pivotal joint as shown in the embodiment of FIGS. 7-9 that allows the blade axis of rotation 24 to be made horizontal in the lowered position.

Figure 13:
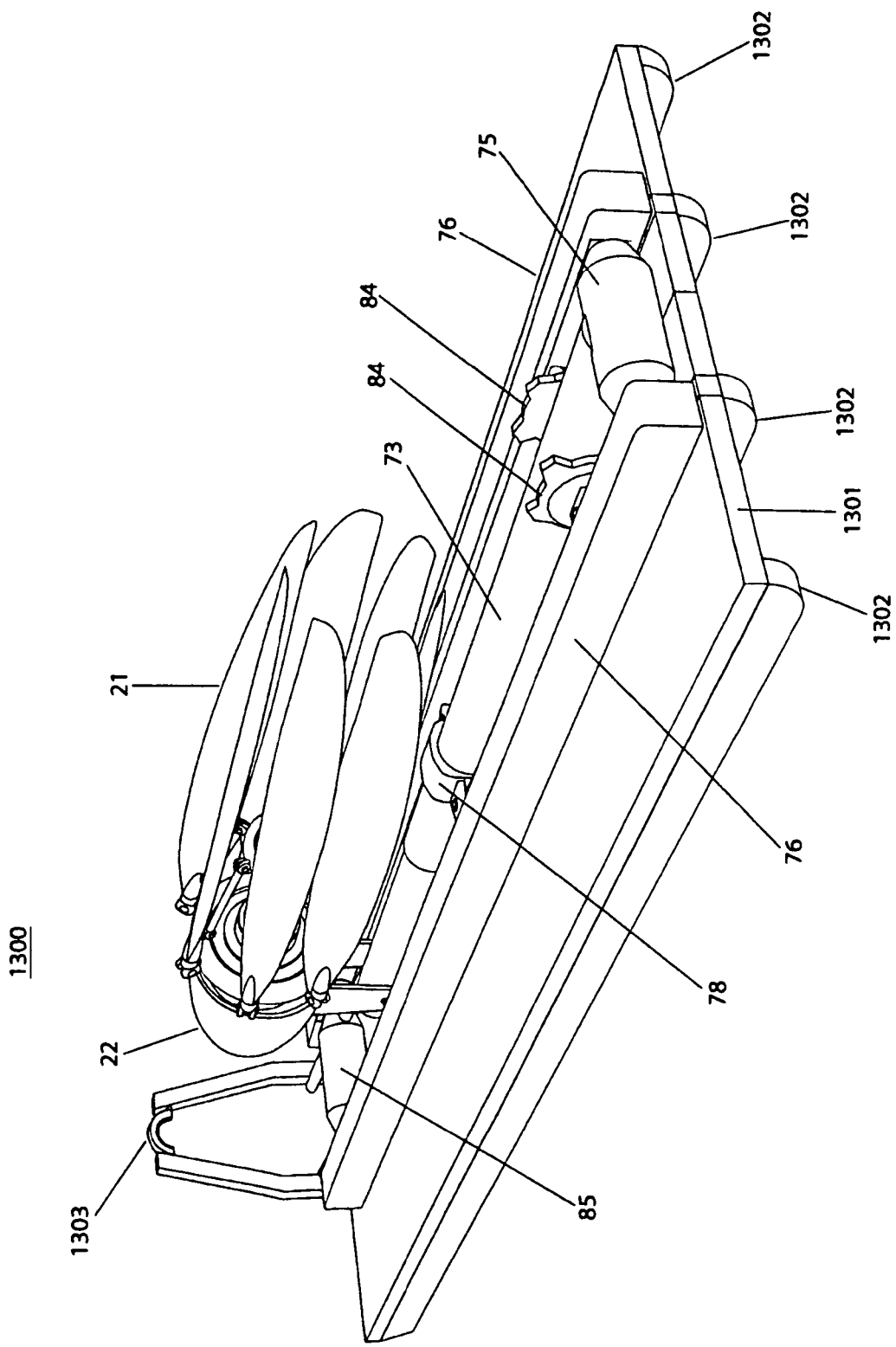
FIG. 13 is a perspective view of palletized turbine generator mounted on a transportation pallet.

FIG. 13 is a perspective view of a palletized turbine generator 1300 mounted on an exemplary transportation pallet. The exemplary pallet includes a base 1301, a number of support rails 1302, and a handle 1303. The base 1301 has the general shape of a rectangular plate sized to fit within an ISO shipping container. Along one of the short ends of the base 1301 is a handle 1303 adapted as an attachment point for a hoist or other lifting apparatus. Support rails 1302 run in parallel under and along the long axis of the base 1301. The support rails 1302 provide additional structural load capacity and stiffness for the base. They also may serve as the ground contact point for the pallet. Ends of the rails may be curved to reduce sliding friction when the pallet is dragged along the ground or slid into or out of an ISO container.

On top of the base 1301 are mounted components of a turbine generator 1300 similar to components described above in connection with other embodiments. Two rails 76 run in parallel on top of, and along the long axis of the base 1301. A sliding axle 75 and fixed axle 85 are positioned between the rails 76. A mast 73 mounts at its base to the sliding axle 75 and through a collar 78 to pivot arms (not shown) that in turn couple to the fixed axle 85. Also attached to the mast 73 are side arms (not shown) having base plates 84. A nacelle 22 mounts to the mast 73 through a pivotal joint (not shown), and blades 21 connect to an electrical generator within the nacelle 22.

Figure 14:
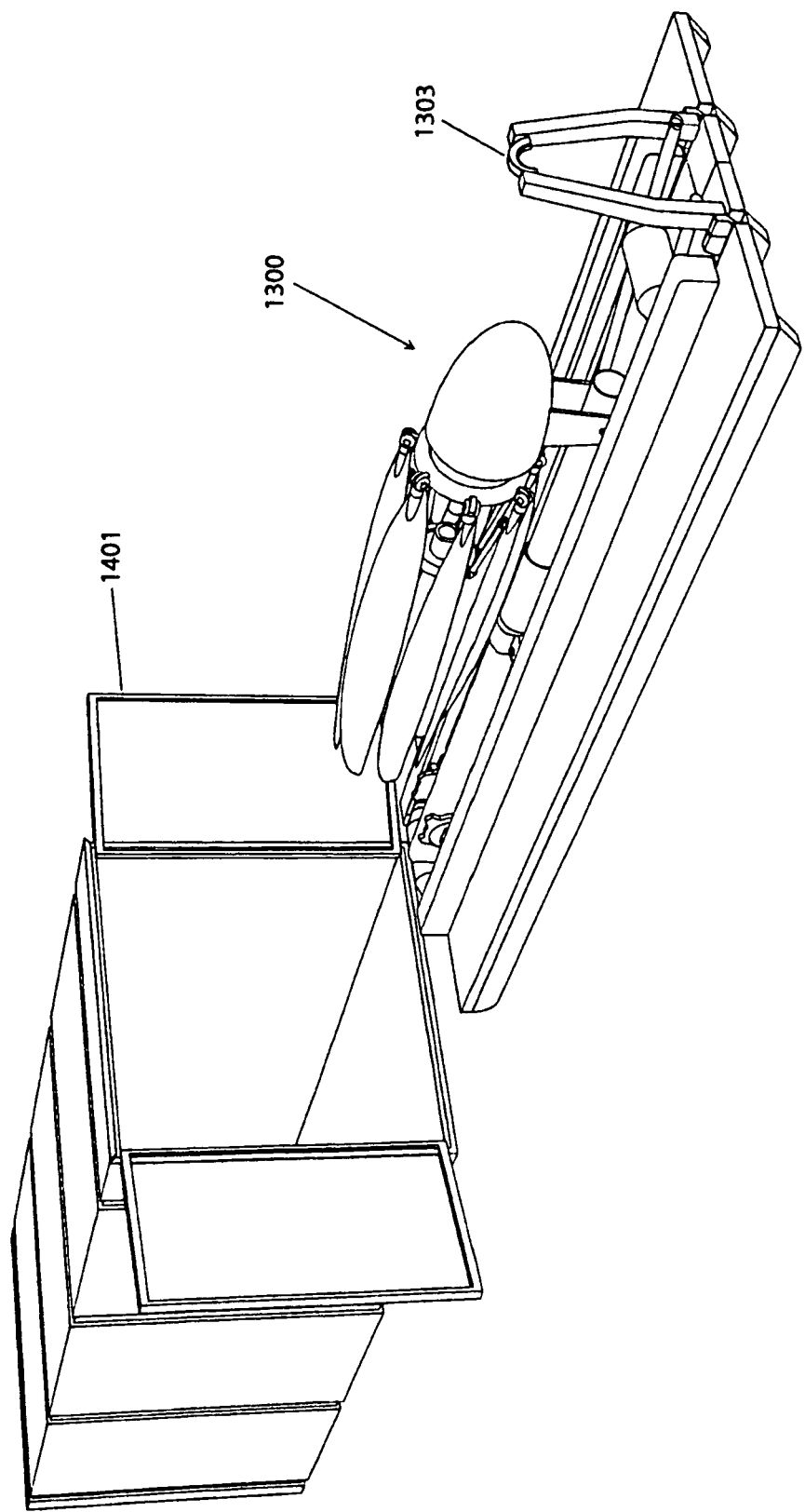
FIG. 14 is a perspective view of a palletized turbine generator aligned for loading into, or removal from, an ISO container.

One particularly advantageous pallet has the form factor of a container roll-in/roll-out pallet ("CROP"), which is adapted for use with the U.S. Army Palletized Load System. An exemplary CROP is disclosed in U.S. Reissue Pat. RE 38,076 ("Stackable Pallet"), but other pallet designs may be used. Such pallets are adapted for multimodal transportation. In one transportation mode, the pallet with connected erection structure and turbine generator may be inserted into an ISO shipping container and placed aboard a seagoing vessel. In other transportation modes, the pallet and its attached payload may be loaded onto self-propelled vehicles or towed vehicles. FIG. 14 is a perspective view of a palletized turbine generator 1300 aligned for loading into, or removal from an ISO container 1401. The palletized turbine generator 1300 may be withdrawn from shipping containers by use of a PLS truck equipped with an integral self-loading and unloading capability, such as an M1074 prime mover truck equipped with a variable reach Material Handling Crane (MHC) connected to the handle 1303. The Material Handling Crane also can be used for loading and unloading the palletized turbine generator onto or off of trailers or other transportation platforms, and the Material Handling Crane may provide the motive force for erecting the mast into a vertical position for turbine generator operation. Other pallet designs may be transported by air, such as illustrated in U.S. Pat. No. 6,957,613 ("Airlift pallet for container roll-in/out platform (CROP)").

In the transportation configuration, the turbine generator nacelle and blades will have a cross sectional diameter for transportation (as presented in the direction of the propelling vehicle motion) that is substantially less than its cross section as presented to a prevailing wind when the turbine generator is in operations. Preferably the cross sectional diameter for transportation will be the same order of magnitude as the cross sectional diameter of the propelling vehicle itself, and more preferably about the same as the propelling vehicle, or less. In addition, the elevation of the turbine generator nacelle and blades for transportation (as measured by the center of the cross sectional diameter for transportation) will be substantially lower than when the turbine generator is in operation. Preferably, the height of the turbine generator above the transportation platform during transportation will be the same order of magnitude as the cross sectional diameter of the turbine generator nacelle and blades themselves, and more preferably about the cross sectional diameter of the turbine generator nacelle and blades themselves, or less. Transportation configurations provide for convenient relocation of the wind turbine over relatively large distances to, e.g., locations having different consumers of power, as compared to merely adjusting the orientation of the wind turbine over time to maximize power output for a fixed consumer.

While the embodiments above have been described in connection with an axial flow wind turbine having seven blades and nacelle-mounted electrical generator, it will be appreciated that other designs of wind turbine may be used. For example, horizontal axis wind turbines having two, three or other numbers of blades may be used, and transverse-axis or vertical axis wind turbines may be used. Wind turbines may be used in combination with alternators or generators, and such alternators/generators may be coupled to the blades through transmission systems having gear boxes and drive shafts, including placement of the alternators/generators outside the nacelle.

Additional advantage may be obtained by combining the mobile wind turbine with additional sources of power generation, such as solar cell panels. In such a combination, the solar cells and wind turbine may share common power conditioning apparatus, such as inverters, batteries, switches, cables, etc.

Figure 15:
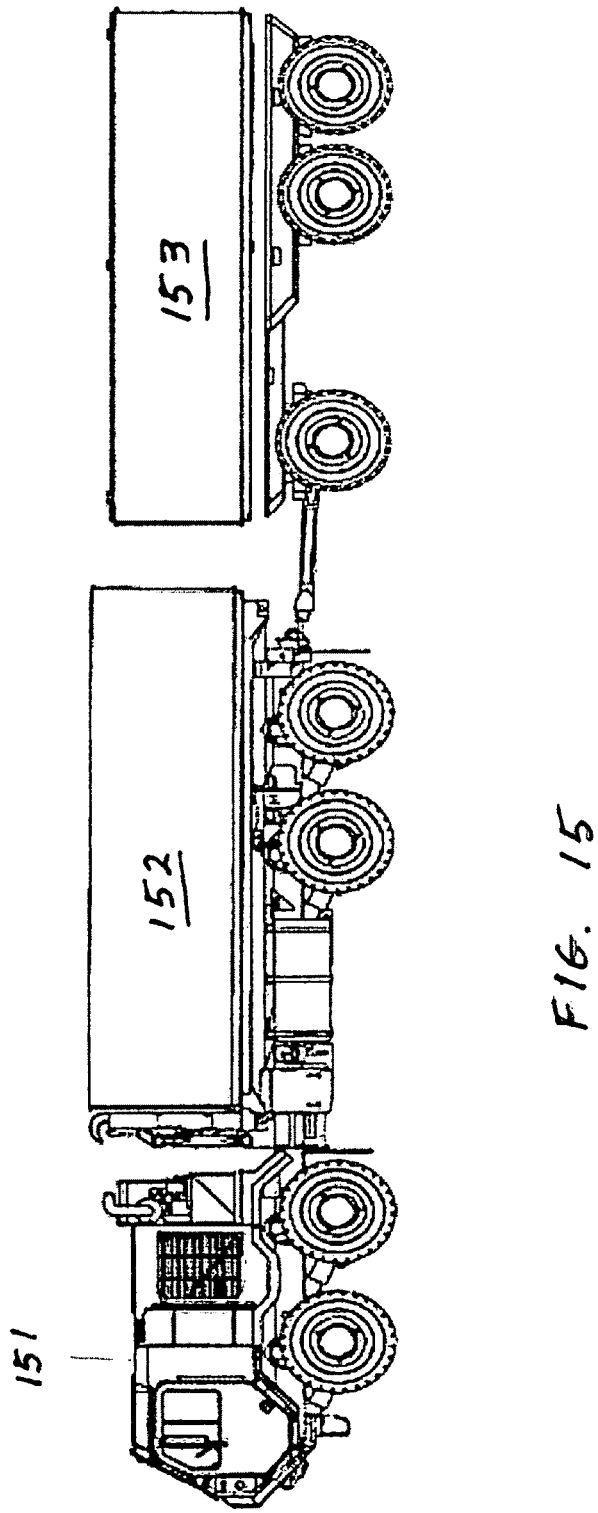
FIG. 15 is a side view of a two mobile electricity generation systems configured for transportation.

FIG. 15 is a side view of mobile hybrid electricity generation systems configured for transportation. A motive vehicle 151 carries a first system 152 and tows a second system 153. The hybrid electricity generation systems 152, 153 preferably have a transportation configuration with an outer form factor of a standard, 20-foot long shipping container. Other form factors may be used. An exemplary motive vehicle 151 may be an Oshkosh HEMTT diesel-electric vehicle. Other motive vehicles and configurations may be used. The first and second hybrid electricity generation systems 152, 153 will be described in more detail below with reference to FIGS. 16 and 17.

Figure 16:
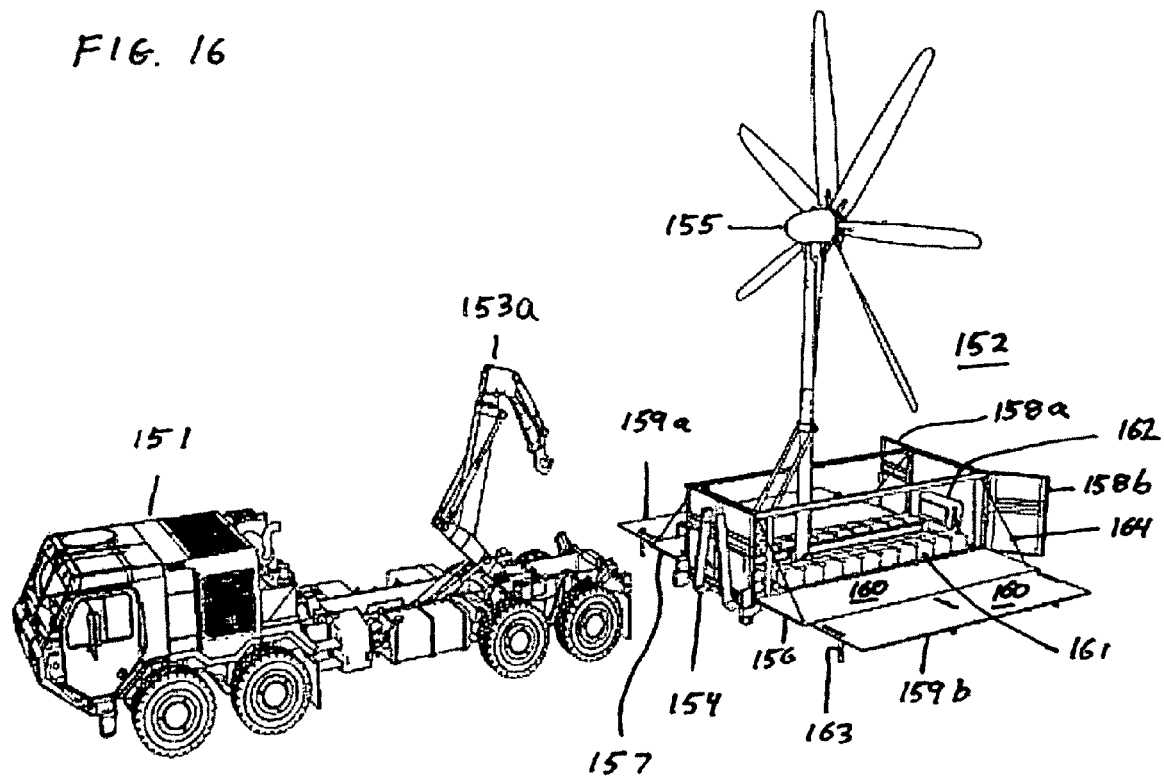
FIG. 16 is a perspective view of a mobile electricity generation system partially configured for operation.

FIG. 16 is a perspective view of a first mobile hybrid electricity generation system 152 configured for operation. In this view, the motive vehicle 151 has dismounted the hybrid electricity generation system 152 using an integrated hydraulic arm 153a. An exemplary first mobile hybrid electricity generation system 152 has an A-arm 154 of a type similar to those known for use with palletized loading systems. The motive vehicle 151 can attach the hydraulic arm to the A-arm 154 and lift it in a manner known for use with palletized loading systems to mount and dismount the first mobile hybrid electricity generation system 152 while in its transportation configuration.

After dismounting, the hybrid electricity generation system 152 may be reconfigured from a transportation configuration to an operational configuration generally as shown. A wind turbine 155 may be transported in a transportation configuration in which the blades are folded and the mast retracted as discussed above to fit within the form factor of a shipping container. In FIG. 16, the wind turbine 155 has been elevated to an operational configuration where it may convert wind energy to electricity.

The wind turbine sliding axel preferably mounts to a flatrack or other structure that preferably has reconfigurable, generally rectangular side walls 156, 157, bifurcated end wall 158a, 158b, and bifurcated top 159a, 159b. Preferred side walls 156, 157 hinge at their lower ends and fold from a vertical orientation for transportation to a horizontal orientation for operation. Other arrangements may be used, such as hinging side walls 156, 157 at their upper ends. Preferred top 159a, 159b has two pieces that separate along a seam that runs along the long axis of the system, preferably down a centerline. A first piece of the top 159a attaches with a hinge to one side wall 157, and a second piece of the top 159b attaches with a hinge to the opposing side wall 159. In the operation configuration, the side walls 156, 157 fold down along with attached top pieces 159a, 159b. The opening of the side walls 156, 157 and top pieces 159a, 159b exposes their interior surfaces. Photovoltaic cells 160 that are preferably mounted to these interior surfaces become exposed to sun light and generate electricity. Support legs 163 may be provided to support the side walls 156, 157 and top pieces 159a, 159b in the operational configuration. In the transportation configuration, the side walls 156, 157 fold up, and the top pieces 159a, 159b fold over and join to form a complete, preferably weatherproof perimeter. The solar panels would be preferably located in the interior of the perimeter, along with the wind turbine and other equipment. An electric motor and cable system 164 may be provided to open and close the side walls 156, 157 and top pieces 159a, 159b. The motor and cable system 164 may be provided with a controller to vary the angle of the side walls 156, 157 and top pieces 159a, 159b in order to maximize power capture, such as by tracking the elevation of the sun throughout its daily transit. Other reconfiguration systems for the side walls may be used, such as direct mechanical drive, hydraulic, etc.

End wall pieces 158a, 158b preferably have the form factor of swing-out doors similar to those of a commercial shipping container, which may be opened separately from the side walls while the entire system 152 is otherwise in the transportation configuration.

Electricity generated by the wind turbine 155 and/or photovoltaic cells 160 are preferably stored in storage devices 161, which may be batteries, capacitors, or other devices. An electric inverter, fuses, distribution panel, instrument and control panel, and other accessories may be provided in a weatherproof housing 162 located at or near the end wall pieces 158a, 158b. A protective shielding or housing (not shown) may be provided for environmental protection of batteries and other internal equipment while in the operational configuration.

While the system of FIG. 16 is shown as being mounted and dismounted to a motive vehicle, it may also be mounted and dismounted as an integral unit to a trailer or other vehicle.

Figure 17:
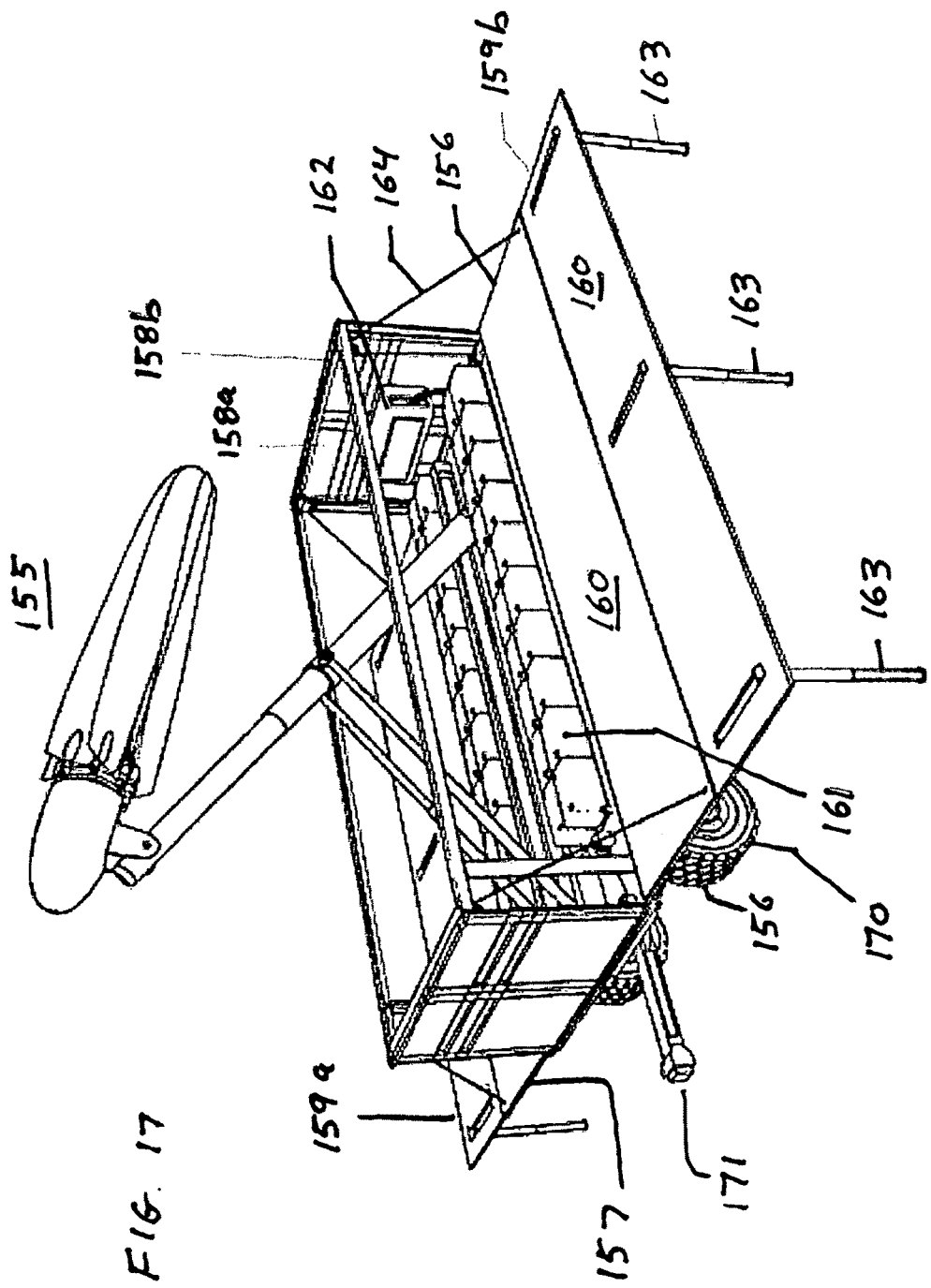
FIG. 17 is a perspective view of a mobile electricity generation system partially configured for operation.

FIG. 17 is a perspective view of a second mobile hybrid electricity generation system partially configured for operation. Most components are the same as correspondingly-numbered components described above in connection with FIG. 16, including: wind turbine 155, side walls 156, 157, end wall pieces 158a, 158b, top pieces 159a, 159b, photovoltaic cells 160, storage devices 161, weatherproof housing 162, support legs 163, and electric motor and cable system 164. The wind turbine 155 is shown in a partially elevated position. The system of FIG. 17 differs from that of FIG. 16 by being integrated into a trailer having wheels 170 and a tow arm 172, rather than as a separate mountable, dismountable unit.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claimed is:

1. A method of moving a wind power extraction device comprising:
   providing a wind turbine having at least two rotating blades rotatable about an axis of rotation, each of the blades being configurable between a first open position substantially perpendicular to the axis of rotation and a second closed position substantially parallel to the axis of rotation,
   providing an articulated mast at a first end connecting to a support structure and a second end connected to the wind turbine,
   the wind power extraction device having:
      (a) a first storage configuration that positions the wind turbine at an elevation proximate to a platform, with the mast being substantially horizontal and the axis of rotation being substantially parallel to and laterally offset from a long axis of the mast; and
      (b) a second deployed configuration that positions the wind turbine at an elevation remote from the platform, with the mast being substantially vertical and the axis of rotation being substantially perpendicular to the mast;
   first moving the wind power extraction device from the first storage configuration to the second deployed configuration; and
   second moving the wind power extraction device, after the first moving, from the second deployed configuration to the first storage configuration;
   maintaining, during the first moving and/or the second moving, the axis of rotation of the wind turbine in an orientation that is generally horizontal as the wind power extraction device moves between the second deployed configuration and the first storage configuration.

2. The method of claim 1, further comprising maintaining, during the first moving, the axis of rotation in an orientation that is generally horizontal as the wind power extraction device moves from the first storage configuration to the second deployed configuration.

3. The method of claim 1, further comprising maintaining, during the second moving, the axis of rotation of the wind turbine in an orientation that is generally horizontal as the wind power extraction device moves from the second deployed configuration to the first storage configuration.

4. A method of moving a wind power extraction device comprising:
   (A) providing a wind power extraction device including a wind turbine having at least two rotating blades rotatable about an axis of rotation, each of the blades being configurable between a first position substantially perpendicular to the axis of rotation and a second position substantially parallel to the axis of rotation,
   (B) providing an articulated erection structure having a first configuration that positions the wind power extraction device at an elevation proximate to a transportation platform, and a second configuration that positions the wind power extraction device at an elevation remote from the transportation platform;
   (C) using the articulated erection structure, positioning the wind power extraction device at an elevation proximate to the elevation of the transportation platform; and
   (D) transporting the wind turbine coupled to the transportation platform;
   maintaining the axis of rotation generally horizontal as the erection structure transitions from the second configuration to the first configuration,
   wherein, in the second configuration that positions the wind turbine proximate to the platform, the axis of rotation is substantially parallel to and laterally offset from a long axis of the articulated erection structure.

5. A method as in claim 4 wherein:
   (A) the articulated erection structure includes a mast having a long axis that can be reconfigured from a generally horizontal orientation to a generally vertical orientation; and
   (B) the method includes a step of rotating the axis of rotation of the rotating blades relative to the long axis of the mast.

6. A method as in claim 4 wherein the step of transporting the wind turbine includes a step of inserting the wind turbine, the erection structure, and the transportation platform into a transport container.

7. A method as in claim 4 in which the step of transporting the wind turbine includes steps of transporting the wind turbine coupled to the articulated erection structure by multiple transportation modes selected from the set of: (i) a water born mode, (ii) a land born mode, and (iii) an air born mode.

8. The method of claim 4, wherein the wind turbine includes a nacelle, and the blades in the second position extend entirely forward from the nacelle.

9. A mobile wind power extraction device comprising:
   (A) a base characterized by a long axis;
   (B) a wind turbine having at least two rotating blades rotatable about an axis of rotation, each of the said blades being configurable between a first position substantially perpendicular to the axis of rotation and a second position substantially parallel to the axis of rotation; and
   (C) an articulated erection structure having a long axis and coupling the wind turbine to the base, said erection structure being reconfigurable between
      (1) a first configuration in which the wind turbine is elevated, and the blades are in the first position, and
      (2) a second configuration in which the wind turbine is lowered, the blades are in the second position, and the axis of rotation is substantially parallel to and laterally offset from the long axis of the articulated erection structure;

an actuator
   wherein the actuator maintains the axis of rotation generally horizontal when the erection structure transitions over the entire path from the second configuration to the first configuration.

10. A device as in claim 9 wherein the base is a pallet.

11. A device as in claim 9 wherein the articulated erection structure includes a mast having a first end and a second end remote from the first end along a long axis, where a first end of the mast couples to the wind turbine and the second end of the mast couples to the base.

12. A device as in claim 11 wherein:
   (A) in the first configuration for operation, the long axis of the mast is in a generally vertical orientation with the wind turbine elevated relative to the base; and
   (B) in the second configuration for transport, the long axis of the mast is in a generally horizontal orientation with the wind turbine at generally the same elevation as the base.

13. A device as in claim 11 wherein the mast couples to the wind turbine through an articulating joint allowing the wind turbine axis of rotation to rotate relative to the mast long axis.

14. A device as in claim 11 wherein the mast comprises a plurality of sections that reconfigure between
   (A) a first length when the erection device is in the first position, and
   (B) a second length shorter than the first length when the erection device is in the second position.

15. A device as in claim 9 wherein the articulation structure includes at least one arm pivotally coupled to the mast and bracing the mast relative to the base.

16. A device as in claim 15 further including at least a second arm pivotally coupled to the mast and bracing the mast relative to the base.

17. The device of claim 9, wherein the wind turbine includes a nacelle, and the blades in the second position extend entirely forward from the nacelle.

18. The device of claim 9, wherein the erection structure has a third configuration in which the wind turbine is elevated, the axis of rotation is substantially perpendicular to long axis of the erection structure, and the blades are in the second position.

19. The device of claim 18, wherein the erection structure is reconfigurable from a deployed to a retracted state by reconfiguring, in order, from the first configuration, to the third configuration, and to the second configuration.

20. An articulated erection structure for use in mobilizing a wind energy extraction device, comprising:
   a wind turbine with at least two rotating blades, rotatable about an axis of rotation, said blades being configurable between a first position substantially perpendicular to the axis of rotation and a second position substantially parallel to the axis of rotation;
   said articulated erection structure comprising a mast having a first end and a second end remote from the first end along a long axis;
   (1) the first end of the mast is adapted to couple to the wind turbine, and the second end of the mast is adapted to couple to a base; and
   (2) the mast is reconfigurable from a first configuration in which the wind turbine is elevated relative to the base, and a second configuration that positions the wind turbine proximate to the base;
   an actuator;
   wherein, in the second configuration that positions the wind turbine proximate to the base, the axis of rotation is substantially parallel to and laterally offset from the long axis of the mast, and the rotating blades are in the second position;
   wherein the actuator maintains the axis of rotation generally horizontal when the erection structure transitions over an entire path from the second configuration to the first configuration.

21. An erection structure as in claim 20 wherein the mast couples to the wind turbine through an articulating joint allowing the wind turbine axis of rotation to rotate relative to the mast long axis.

22. The erection structure of claim 20, wherein the wind turbine includes a nacelle, and the blades in the second position extend entirely forward from the nacelle.

* * * * *